US010469484B1

(12) United States Patent
Chen et al.

(10) Patent No.: US 10,469,484 B1
(45) Date of Patent: Nov. 5, 2019

(54) AUTOMATIC DISCOVERY AND RETRIEVAL OF INTEROPERABLE APPLICATIONS

(71) Applicant: Google LLC, Mountain View, CA (US)

(72) Inventors: Muxing Chen, San Francisco, CA (US); Chandan Gopal Lodha, Santa Cruz, CA (US); Jie Shao, San Jose, CA (US); Jan Willem Maarse, Broomfield, CO (US); EMil Praun, Union City, CA (US); Gokay Baris Gultekin, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 119 days.

(21) Appl. No.: 14/970,922

(22) Filed: Dec. 16, 2015

Related U.S. Application Data

(60) Provisional application No. 62/108,445, filed on Jan. 27, 2015.

(51) Int. Cl.
*H04L 29/06* (2006.01)

(52) U.S. Cl.
CPC ........ *H04L 63/0853* (2013.01); *H04L 63/062* (2013.01); *H04L 63/0823* (2013.01); *H04L 63/0876* (2013.01); *H04L 63/10* (2013.01)

(58) Field of Classification Search
CPC ............... H04L 63/0853; H04L 63/062; H04L 63/0823; H04L 63/0876; H04L 63/10
See application file for complete search history.

(56) References Cited

U.S. PATENT DOCUMENTS

| 7,668,838 | B2 | 2/2010 | Baio et al. |
| 7,818,792 | B2 | 10/2010 | Shamsaasef et al. |
| 8,590,029 | B2 | 11/2013 | Vitaletti |
| 2005/0192863 | A1 | 9/2005 | Mohan |
| 2007/0233708 | A1* | 10/2007 | Baio ...................... G06Q 10/10 |
| 2011/0047594 | A1 | 2/2011 | Mahaffey et al. |

(Continued)

OTHER PUBLICATIONS

Xingkai et al., The Third-Party Applications Development Based on Social Network Open Platform, IEEE, 2014 Fifth International Conference on Intelligent Systems Design and Engineering Applications, Dec. 8, 2014 (Year: 2014).*

(Continued)

*Primary Examiner* — Luu T Pham
*Assistant Examiner* — Harvey I Cohen
(74) *Attorney, Agent, or Firm* — McDonnell Boehnen Hulbert & Berghoff LLP

(57) ABSTRACT

Implementations disclosed herein provide for a third-party application an ability to access a first-party notification interface without receiving credentials linked to a first-party user account. In addition, a device-level permission is established such that each third-party application operating on a client device does not need to seek permission to access the notification interface. A third-party application may request an access code from a client device. The access code may be presented to an authentication server. The authentication server may provide an access token and a refresh token to the third-party application. The third party application may provide the access token and data to be included in a notification to the first-party notification interface.

25 Claims, 6 Drawing Sheets

(56) References Cited

U.S. PATENT DOCUMENTS

| | | | | |
|---|---|---|---|---|
| 2012/0117626 | A1* | 5/2012 | Yates | H04L 9/3213 |
| | | | | 726/4 |
| 2013/0054803 | A1* | 2/2013 | Shepard | H04L 63/0884 |
| | | | | 709/225 |
| 2014/0007195 | A1* | 1/2014 | Gupta | G06F 21/34 |
| | | | | 726/4 |
| 2014/0129448 | A1* | 5/2014 | Aiglstorfer | G06Q 20/3223 |
| | | | | 705/44 |
| 2014/0310792 | A1* | 10/2014 | Hyland | H04L 63/0861 |
| | | | | 726/8 |
| 2014/0359745 | A1* | 12/2014 | Setton | G06Q 30/0277 |
| | | | | 726/9 |
| 2016/0065541 | A1* | 3/2016 | Winner | H04L 63/0421 |
| | | | | 726/6 |
| 2016/0337351 | A1* | 11/2016 | Spencer | H04L 63/0876 |

OTHER PUBLICATIONS

Shehab et al., Towards Enhancing the Security of OAuth Implementations in Smart Phones, 2014 IEEE International Conference on Mobile Services, Oct. 16, 2014 (Year: 2014).*

Payne, Secure Mobile Application Development, IEEE, IT Professional, vol. 15, Issue: 3, May-Jun. 2013, pp. 6-9, May 23, 2013 (Year: 2013).*

* cited by examiner

US 10,469,484 B1

AUTOMATIC DISCOVERY AND RETRIEVAL OF INTEROPERABLE APPLICATIONS

BACKGROUND

Many users operate devices, such as a smartphone, tablet, or laptop, with third-party applications and first-party applications. A first party application may refer to an application that is provided by the same developer as an operating system. A third party application may refer to an application that can be installed and operate on a device with the operating system, but is from a different developer. Thus a programed authored by the same provider as the operating system may be deemed a first party application.

A user may have a user account that is associated with the first-party applications and a separate user account for a third-party application. In some instances, a third-party application may seek to utilize one or more of the features provided by a first-party application. However, to obtain such access, the user may be required to provide user credentials and/or to approve the use of the first-party application or service by the third-party application. If the user has several different third-party applications installed on a device, it may become tedious to approve each of the third-party applications. Further, it may not be desirable to have the first-part application provider know the credentials (e.g., user name, password) of the third-party application or vice versa.

BRIEF SUMMARY

According to an implementation of the disclosed subject matter, a client device associated with a first user account may receive a permission setting that allows third-party applications to access a first-party notification interface that would otherwise be restricted to use only by first-party applications on the client device. A first request may be received from a third-party application operating on the client device. The first request may be for an access code that defines a level of access to the client device. The third-party application may be associated with a second user account at a third-party service. The access code may be provided from the client device to the third-party application. The access code may be exchangeable for a refresh token and an access token provided by an authentication server. The access token and data from the third-party service to be included in a notification generated by the first-party notification interface may be received. The notification may be presented on the client device.

A system is disclosed herein that includes a processor of a client device associated with a first user account. The processor may be configured to receive a permission setting that allows third-party applications to access a first-party notification interface that would otherwise be restricted to use only by first-party applications on the client device. The processor may be configured to receive, from a third-party application operating on the client device, a first request for an access code that defines a level of access to the client device. The third-party application may be associated with a second user account at a third-party service. The processor may be configured to provide, from the client device to the third-party application, the access code. The access code may be exchangeable for a refresh token and an access token provided by an authentication server. The processor may be configured to receive, from the third-party application, the access token and data from the third-party service to be included in a notification generated by the first-party notification interface. The processor may be configured to present the notification on the client device.

In an implementation, an access code may be requested by a third-party application operating on a client device. The access code may be requested from the client device. Permission to access a first-party notification interface that would otherwise be restricted to use only by a first-party application on the client device may have been obtained. The access code may define a level of access to the client device. The third-party application may be associated with a second user account at a third-party service. The access code may be received by the third-party application from the client device. The access code may be presented to an authentication server. Responsive thereto, a refresh token and an access token may be received from the authentication server. A request may be provided by the third-party application to the first-party notification interface on the client device. The request may include the access token and data from the third-party service to be included in a notification presented by the first-party notification interface.

A system is provided in an implementation that includes a processor of a client device associated with a first user account. The process may be configured to request, by a third-party application operating on a client device, an access code from the client device. Permission to access a first-party notification interface that would otherwise be restricted to use only by a first-party application on the client device may have been obtained. The access code may define a level of access to the client device. The third-party application may be associated with a second user account at a third-party service. The third-party application may receive the access code from the client device. The processor may be configured to present the access code to an authentication server. Responsive to presenting the access code to the authentication server, the processor may be configured to receive a refresh token and an access token from the authentication server. The processor may be configured to provide, by the third-party application, a request to the first-party notification interface on the client device. The request may include the access token and data from the third-party service to be included in a notification presented by the first-party notification interface.

In an implementation, a system according to the presently disclosed subject matter may include a means for receiving, by a client device associated with a first user account, a permission setting that allows third-party application to access a first-party notification interface that would otherwise be restricted to use only by first-party application on the client device. The system may include a means for receiving, from a third-party application operating on the client device, a first request for an access code that defines a level of access to the client device. The third-party application may be associated with a second user account at a third-party service. The system may include a means for providing, from the client device to the third-party application, the access code. The access code may be exchangeable for a refresh token and an access token provided by an authentication server. The system may include a means for receiving, from the third-party application, the access token and data from the third-party service to be included in a notification generated by the first-party notification interface. The system may include a means for presenting the notification on the client device.

As disclosed herein, a system according to the presently disclosed subject matter may include a means for requesting, by a third-party application operating on a client device, an access code from the client device. Permission to access a first-party notification interface that would otherwise be restricted to use only by a first-party application on the client device may have been previously obtained. The access code may define a level of access to the client device. The third-party application may be associated with a second user account at a third-party service. The system may include a means for receiving, by the third-party application, the access code from the client device. The system may include a means for presenting the access code to an authentication server. The system may, responsive to presenting the access code to the authentication server, include a means for receiving a refresh token and an access token from the authentication server. The system may include a means for providing, by the third-party application, a request to the first-party notification interface on the client device that comprises the access token and data from the third-party service to be included in a notification presented by the first-party notification interface.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations disclosed herein provide a way to link securely a third-party account to a first-party account based on a device-level association. For example, a user may be logged into a third-party application on a client device (e.g., a smartphone, tablet, computer, etc.) and be logged into a first-party account associated with that device. The user may seek to authorize the third-party application to send user data associated with the third-party application to the user who is logged into the first-party account. The implementations disclosed herein facilitate this exchange in an anonymous manner; that is, the interaction between a first-party application and the third-party application occurs without revealing any personally identifiable information about the user from the user's first-party account to the user's third-party account and vice versa. Similarly, if a user has multiple third-party applications installed on the device, the disclosed implementations permit a device-level opt-in to the links between the first-party account and the multiple third-party accounts. Once the first-party account and the third-party account are linked, data can be securely transferred between the third-party application or service and the first-party application or service over a cloud-computing system.

Thus, the disclosed implementations provide a third-party application the ability to access a first-party account without with the third-party or the first-party knowing the credentials of the other. Second, each third party application does not need to seek consent to utilize a first-party application. Rather, the implementations can provide a device-level consent that can permit a client device to provide tokens to any third-party application. A user can revoke permission for any specific third-party application or all third-party applications.

Third-party applications may seek consent to utilize a feature associated with a first-party account (e.g., utilize a first-party application) on a per application basis. The client device operating the first-party application may notify the user with whom first-party account is linked for each third-party application that sought access to the first-party application. For example, a pop-up may appear on a user's smartphone to ask the user for permission to access the first-party account. Once permission is obtained from the user to provide access to third-party applications, then any third-party application can obtain an access token which provides access to a first-party application. The access token, however, may have a defined limit with respect of its use of the first-party application. As described below, it may provide permission to send a notification through a first-party notification interface.

Figure 1:
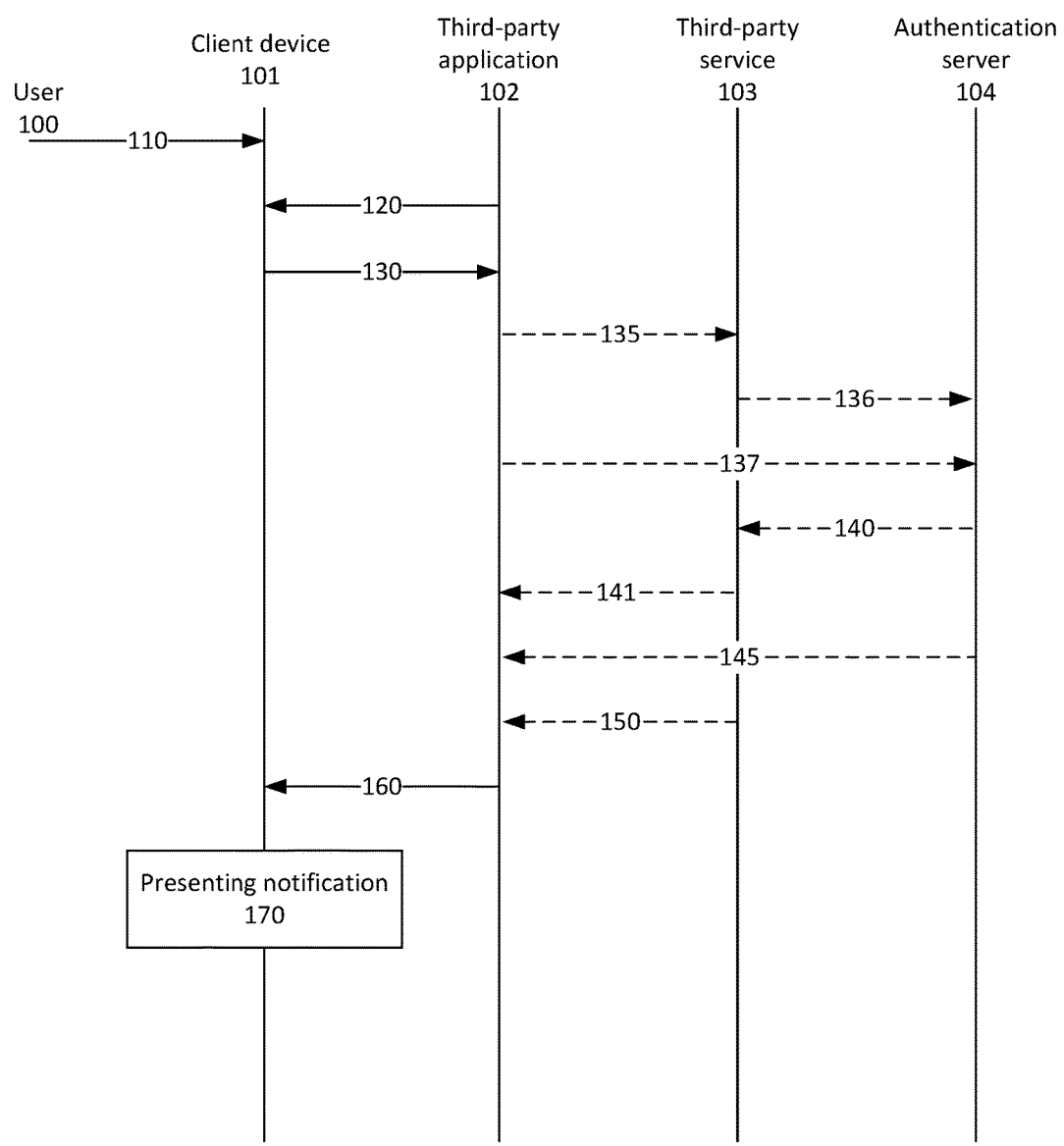
FIG. 1 shows an example process for presenting a notification using a first-party interface as disclosed herein.

An example process for presenting a notification using a first-party interface is provided in FIG. 1. A user 100 may provide a device-level permission to a client device 101 that grants third-party applications access to one or more first-party applications operating on the client device. In some configurations, the permission may be obtained for several first-party applications while in other implementations, it may be provided for only a particular first-party application.

Access to a first-party application may refer to allowing a third-party application to utilize one or more of the features of the first-party application. For example, if the first-party application provides notification interface, a third-party application may be able to provide a notification through the first-party application's notification feature. Examples disclosed herein may be in the context of a first-party notification interface. But, other first-party applications may be utilized according to implementations disclosed herein. The access of the third-party application may be limited to use of a particular feature of the first-party application to prevent the third-party application from knowing the user's credentials. The client device 101 may be associated with a user account belonging to the user 100. The user account may have credentials, such as a user name and password that can be stored on the client device and/or an authentication server 104. Other examples of credentials that may be associated with the user account include: credit card information, a user's real name, an email address, other user names and passwords associated with other first-party applications, etc. Thus, access to the first-party notification interface, for example, may allow a third-party application to provide a notification through the first-party notification interface where the third-party application would otherwise not be permitted to do so.

The device-level permission provided by the user 100 may be provided via a first-party application operating on the client device 101. For example, during the configuration of the client device 101, such as when the device is first linked to the user account, a first-party application may prompt the user to provide permission to third-party applications. In some configurations, the prompt may appear the first time the user 100 activates or uses a feature of the first-party application. The user's permission to grant access to the first-party notification interface (or other first-party application) at 110 may be stored as a permission setting on the client device and/or sent to the authentication server 104.

At 120, a third-party application 102 may request an access code that defines a level of access to the client device 101 from, for example, a first-party application or user account that linked to the client device 101. The third party application 102 may request the access code by an application program interface ("API") that is exposed to third-party applications on the client device 101. The third-party application 102 may be one of several third-party applications that may be installed and/or operating on the client device 101. Because the third-party applications may not be authored by the same entity as the operating system, they may not be granted the same access as first-party applications operating on the same client device 101. The access code may define a level of access to the client device that prevents a first-party application from having access to a user's sensitive data or applications, such as email or from viewing photos stored on the client device 101. Thus, the scope of the access provided by the requested access code may be limited to a particular feature of a first-party notification interface such as having the first-party notification interface provide a notification. The access code may not have an identity scope specifying permissions for accessing the first-party's user identifications and passwords, thereby preventing third-party applications from being able to receive or view a user's credentials.

The client device 101 may provide the access code to the third party application 102 in response to the request at 130. In the event a user had not previously provided device-level permission at 110, then an access code may not be provided by the client device 101 to any third-party applications. The access code may be generated using a variety of methods that are known to those having ordinary skill in the art. In some configurations, the third-party application 102 may not be associated with a third-party server. In such cases, the third-party application 102 may provide the access code to the authentication server 104 at 137. In other cases, the third-party application 102 may be linked to a second user account that is specific for the third-party application 102. The third-party application 102 may contact a corresponding third-party service (e.g., server) 103 and provide the received access code thereto at 135. The third-party service 103 may then contact the authentication server 104 at 136.

The authentication server 104 may provide an access token and refresh token to the third party service at 103 if it submitted the access code or to the third-party application 102 at 145 if it submitted the access code. If the third-party service 103 receives the tokens at 140, it may send the tokens to the third-party application 102 at 141. An example implementation thereof is the OAuth 2.0 protocol, Request for Comments (RFC): 6749 (Internet Engineering Task Force (IETF), October 2012. Briefly, each access token may have an expiry date. Upon reaching the expiry date, the access token may no longer be valid. The refresh token may be utilized to obtain a new access token from the authentication server 104, unless the access permissions associated with the holder of the refresh token have changed since the time the last access token was issued. The tokens obtained from the authentication server 104 may carry the same level of access as defined by the access code that was presented to the authentication server 104, or the level of access may be modified.

The third-party application 102 may be provided with data from the third-party service 103 that is to be included in a notice that is generated by the first-party notification interface on the client device 101 at 150. In configurations in which there is no third-party service 103, the data for the notification may be generated by the third-party application 102. At 160, the access token and data from the third party application 102 or service 103 may be received from the third party application 102 by the first-party notification interface or an API therefor. The first-party notification interface may present the notification on the client device 101 at 170.

As an example, the third-party application may be a real-estate application. The user may have an account specific to the real-estate application that has a distinct username and password from that of the username and password associated with the first-party account linked to the client device. The real-estate application may seek to utilize the first-party notification interface to present to the user notifications about properties that may be offered for sale in the user's locale and/or according to the user's specified preferences regarding size, location, price, school district, etc. The real-estate application may receive an access token and data for inclusion in a notification that is provided by the first-party notification interface from the real-estate application's server. The data may include, for example graphics, text, format, etc. as well as data specific to the user based on the user's account with the real-estate application service (e.g., an email address, user location, etc.). The first-party notification service may specify a format in which data is to be received from a third-party application. For example, it may specify that a notification cannot include any animated parts. It may specify the width and length of the notification as well other formatting requirements with which the notification must comply.

Figure 2:
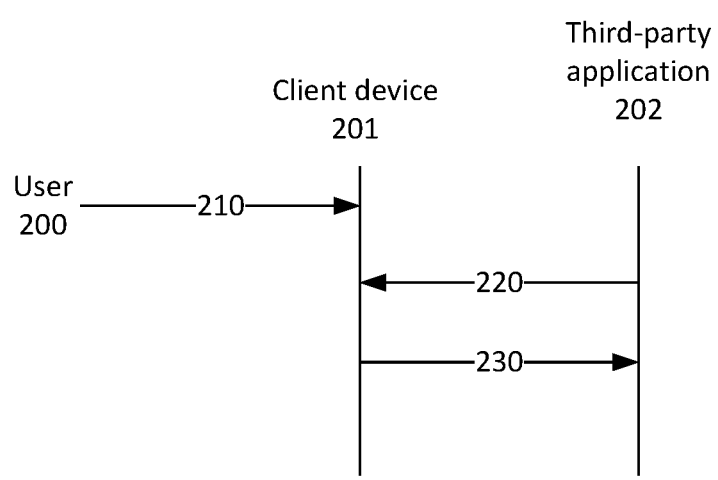
FIG. 2 is an example of how a third-party application may be denied access to the first-party notification interface as disclosed herein.

FIG. 2 is an example of how a third-party application may be denied access to the first-party notification interface. As stated earlier with respect to FIG. 1, a user 100 may provide a device level permission setting which may allow any third-party applications on the client device 101 to utilize a first-party application or service. In an implementation, a user may provide a specific permission setting for an individual third-party application after setting the device-level permission. At 200, a second request may be received by the client device 201 in which the user 200 has requested to deny permission for a third-party application 202 to access the first party notification interface operating on the client device 201. For example, the user 200 may indicate a desire to no longer receive notifications from the third-party application 202. In response, the first-party notification interface may revoke the access token of the third-party application 202. Similarly, a notification sent to the first-party notification interface subsequent to revocation of a token at 220 may be rejected. An indication of either the rejected notification and/or the revoked access token may be provide to the third-party application 220 at 230. At a later point, the user 200 may again opt-in to receiving notifications from the third-party application 202. The third-party application 202 may request an access code from the first party-notification interface as described earlier with respect to FIG. 1 to obtain an access token and a refresh token.

Figure 3:
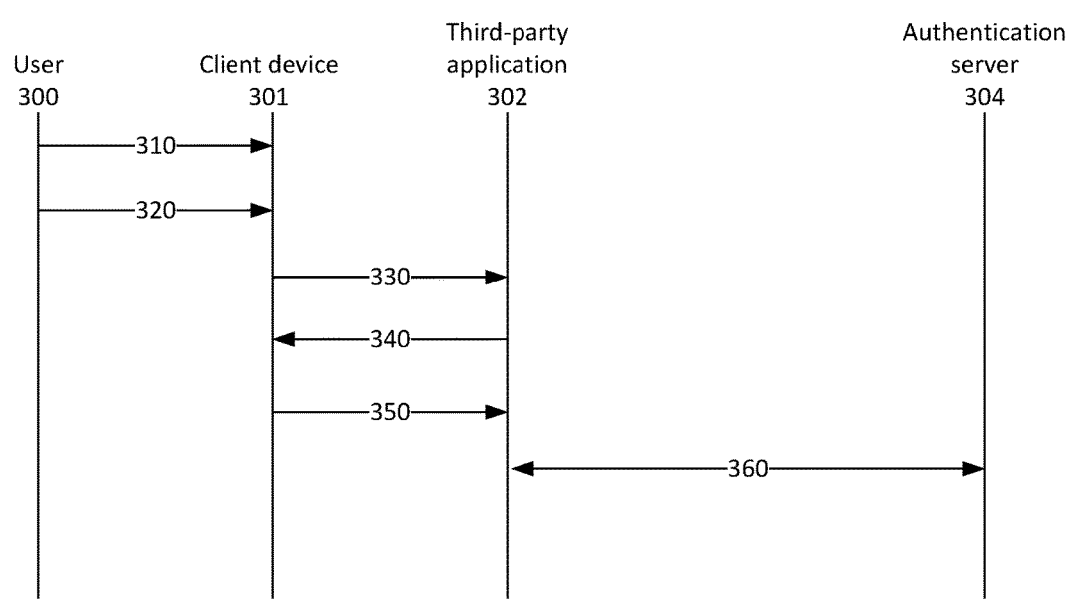
FIG. 3 is an example process for revoking device-level permissions to access the first-party notification interface as disclosed herein.

FIG. 3 is an example process for revoking device-level permissions to access the first-party notification interface. A user 300 may revoke permission for third-party application 302 to access the first-party notification interface at 310. The revocation of permission may be received by the client device 301. The revocation of permission may prevent any third-party application from presenting any notifications through the first-party notification interface. Subsequently, a reinstatement of permission for the third-party applications to access the first-party notification interface may be received at 320. An indication of the reinstatement of permission may be broadcast to the third-party application 302 at 330. This may be advantageous compared to existing systems that have each third-party application query the notification interface (e.g., via periodic polling) to determine whether or not they can again have access. Rather than have the third-party applications poll the first-party notification interface to ask for access, the client device can indicate to the third-party applications that access has been revoked and that it will notify them if and when access is restored by the user.

If a user opts to again allow access to third-party applications, the client device can broadcast the access permission to third-party applications installed thereon. The third-party applications can again request an access code and attempt to obtain an access token and refresh token from the authentication server as described above. As shown in FIG. 3, a third party application may send a request to the first-party notification interface operating on the client device to obtain a second access code at 340. The second access code may be provided to the third party application at 350. The third party application 302 (or a server associated with the third party application) can exchange the second access code for a new refresh token and a new access token by the authentication server 304 at 360.

In some instances, a user may have multiple devices that are associated with a particular user account (i.e., first-party account). For example, a user may have a smartphone that is utilized by the user alone and a tablet that the user shares with a spouse. The user's account may be linked to both devices. In an implementation, the primary client device may be determined for the user account. The determination of which device is the primary device can be based on the type of device. For example, a smartphone may be deemed a more personal device and, therefore, be determined to be the primary device over other types of devices (e.g., tablets, computers, etc.). In some instances, the primary device may be heuristically determined based on the device on which a user installs more applications and/or travels according to GPS readings. In some configurations, a designation of the primary device may be received from the user.

As a specific example, a first user may have a smartphone as a primary device that is linked to the first user's account ABC@provider.com. The first user's account may also be linked to a tablet. The first user may have a second user account ABC2@third-party_application.com that is associated with a real-state application. The second client device, the tablet, may have a third user account, such as XYZ@third-party_application.com, linked to a different third-party application, XYZ. Application XYZ may not be installed on the first user's primary device. Because application XYZ is installed only on a non-primary device, notifications that XYZ generates may not be pushed to the first user's primary device for display by the first-party notification interface. However, a notification for XYZ application may be presented on the user's tablet through the first-party notification interface operating thereon. That is, the same first-party notification interface operating on the primary client device as on the second client device may present a notification for XYZ only on the second client device.

Figure 4:
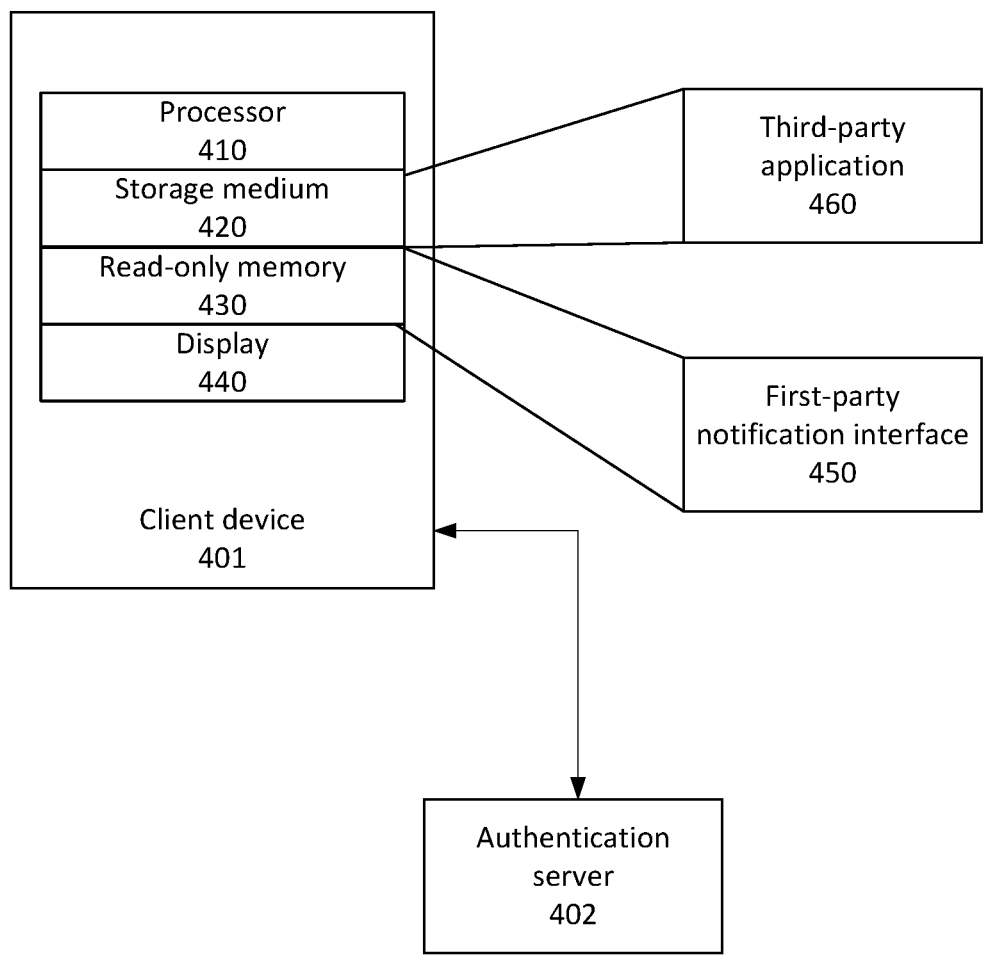
FIG. 4 is an example system for providing a notification from a third-party application on a client device as disclosed herein.

FIG. 4 is an example system for providing a notification from a third-party application on a client device. An example client device 401 that includes a processor 410, a storage medium 420, read-only memory 430, and a display 440. The client device 401 may be associated with a first user account, the credentials for which may be stored on the storage medium 420. The processor 410 may be configured to receive a permission setting that allows third-party applications to access a first-party notification interface 450 that would otherwise be restricted to use only by first-party applications on the client device 401. The first-party notification interface 450 may be stored in the read-only memory 430. Third-party applications may be stored in the storage medium 420. The processor 410 may be configured to receive, from a third-party application 460 operating on the client device 401, a first request for an access code that defines a level of access to the client device 401 as described above. The processor 410 may be configured to provide from the client device 401 to the third-party application 460, the access code. The access code may be exchangeable for a refresh token and an access token provided by an authentication server 402. The processor 410 may be configured to receive, from the third-party application 460, the access token and data from the third-party service to be included in a notification generated by the first-party notification interface 450. The processor may present the notification on the client device 401 via the display 440.

Figure 5:
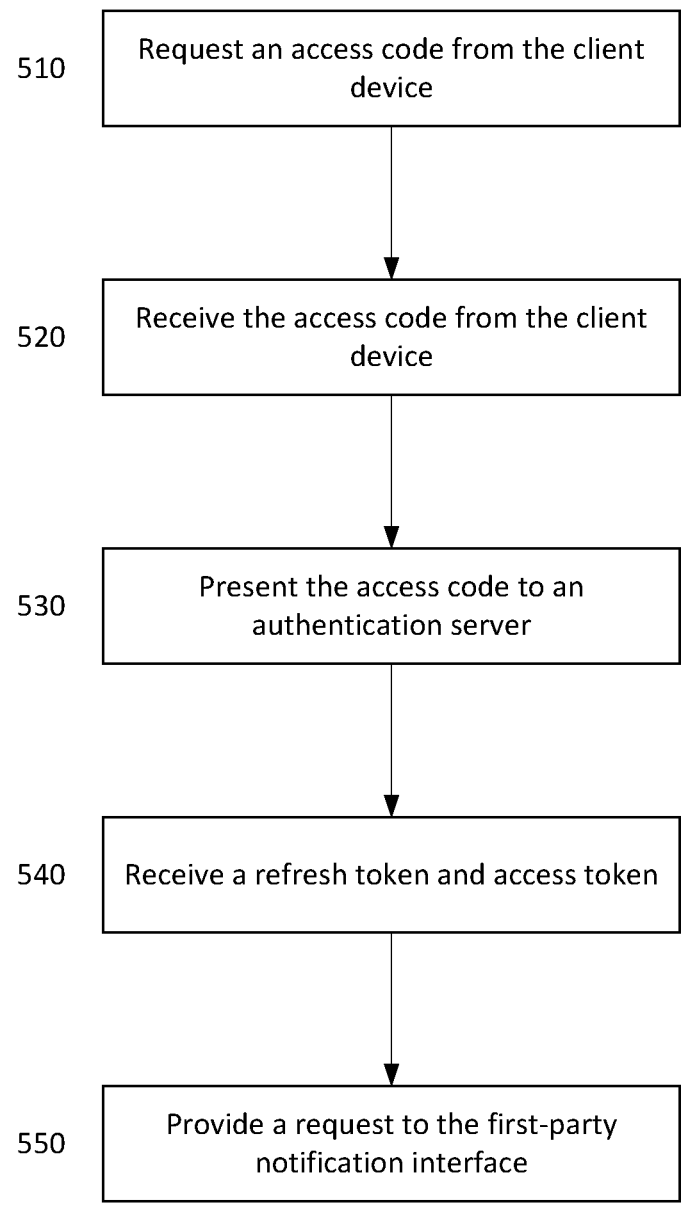
FIG. 5 is an example process for providing a notification to a first-party notification interface as disclosed herein.

FIG. 5 is an example process for providing a notification to a first-party notification interface. At 510, a third-party application operating on a client device may request an access code from the client device. The request may be sent to a first-party notification interface, for example, operating and/or installed on the client device. Permission to access the first-party notification interface may have been previously obtained from a user as described earlier. Without user permission, the first-party notification interface may otherwise be restricted to use only by first-party applications on the client device. The access code may define a level of access to the client device (e.g., inability to read the user's email). At 520, the third-party application may receive the access code form the client device. The access code may be presented to an authentication server at 530 as described above. Responsive to the access code being presented to the authentication server, a refresh token and an access token may be provided by the authentication server at 540. At 550, the third-party application may provide a request to the first-party notification interface on the client device. The request may include the access token and data from the third-party service to be included in a notification presented by the first-party notification interface as described above.

Figure 6:
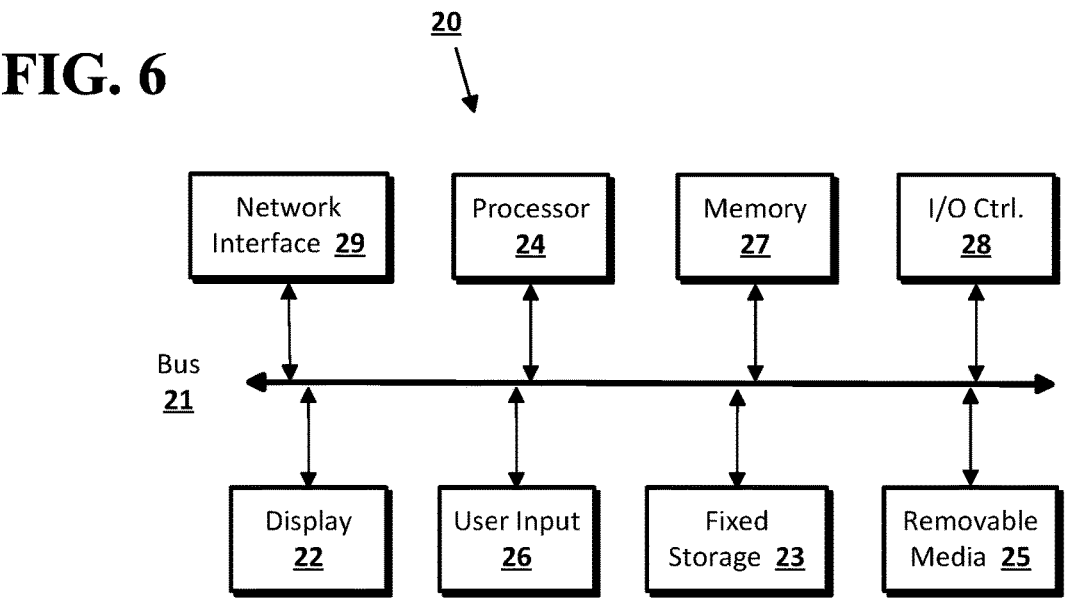
FIG. 6 shows a network configuration according to an implementation of the disclosed subject matter.

Implementations of the presently disclosed subject matter may be implemented in and used with a variety of component and network architectures. FIG. 6 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 7.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 7:
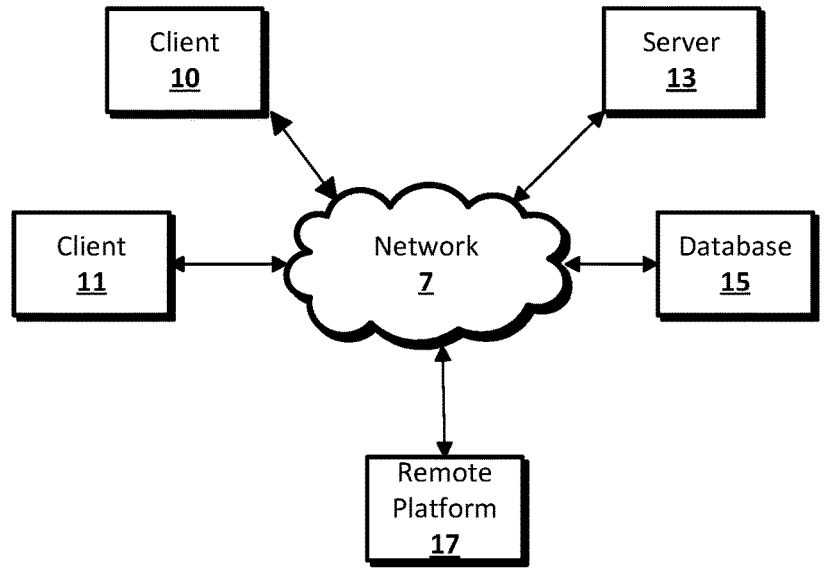
FIG. 7 shows a computer according to an implementation of the disclosed subject matter.

FIG. 7 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive content. For example, as disclosed herein, a user can consent to the data link, opt-in to the link, and opt-out from the link between the first-party application or service and any or all third-party applications and/or services. Consent may happen in at least two places. First, in the first-party notification application, the user may consent to receiving data from third-party services. Second, within the first-party notification application, the user can opt-in or out of the data link between the first-party account and an individual third-party application. If the user opts-out of the first-party application service or any third-party application, the system may revoke the access token, and delete previously sent data.

In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
 receiving, by a client device associated with a first user account, a single device-level permission setting that grants a plurality of third-party applications permission to access a single first-party notification interface operating on the client device that would otherwise be restricted to use only by first-party applications on the client device, wherein the plurality of third-party applications comprises at least a first and a second third-party application;
 receiving, from the first third-party application operating on the client device, a request for an access code that defines a level of access to the client device, wherein the first third-party application is associated with a second user account at a third-party service;
 providing, from the client device to the first third-party application, the access code, wherein the access code is exchangeable by the first third party application for a refresh token and an access token provided by an authentication server;
 receiving, from the first third-party application, the access token and data from the third-party service to be included in a notification generated by the first-party notification interface, wherein the access token was obtained by the first third-party application in response to a request comprising the access code;
 presenting the notification on the client device;
 subsequently receiving a request to deny permission for the second third-party application to access the first-party notification interface; and
 in response to the request to deny permission, updating a setting of the client device to prevent the second third-party application from presenting notifications through the first-party notification interface.

2. The method of claim 1, further comprising:
 rejecting a notification request from the second third-party application, the notification request including data from a second third-party service to be included in a notification generated by the first-party notification interface.

3. The method of claim 1, further comprising:
 in response to the request to deny permission, revoking an access token that was previously provided to the second third-party application.

4. The method of claim 1, further comprising:
 receiving a revocation of permission for the plurality of third-party applications to access the first-party notification interface, wherein the revocation prevents the plurality of third-party applications from presenting any notifications through the first-party notification interface;
 subsequently, receiving, a reinstatement of permission for the plurality of third-party applications to access the first-party notification interface; and
 broadcasting to the third-party applications an indication of the reinstatement of permission.

5. The method of claim 1, further comprising determining that the client device is a primary device for the first user account, wherein the first user account is also linked to a second client device.

6. The method of claim 5, wherein the determination is based on a type of the client device.

7. The method of claim 5, wherein the second client device has a third user account for a third third-party application that is not installed on the client device.

8. The method of claim 7, wherein a third notice for the third third-party application is presented only on the second client device.

9. The method of claim 4, further comprising:
 receiving, from the first third-party application operating on the client device, a request to obtain a second access code for the first-party notification interface, wherein the second access code is exchanged for a new refresh token and a new access token by the authentication server.

10. A system, comprising:
 a non-transitory computer-readable memory having program instructions stored thereon; and
 a processor of a client device associated with a first user account, the processor configured execute the program instructions to:
 receive a single device-level permission setting that grants a plurality of third-party applications permission to access a single first-party notification interface operating on the client device that would otherwise be restricted to use only by first-party applications on the client device, wherein the plurality of third-party applications comprises at least a first and a second third-party application;
 receive, from the first third-party application operating on the client device, a first request for an access code that defines a level of access to the client device, wherein the first third-party application is associated with a second user account at a third-party service;
 provide, from the client device to the first third-party application, the access code, wherein the access code is exchangeable by the third party application for a refresh token and an access token provided by an authentication server;
 receive, from the first third-party application, the access token and data from the third-party service to be included in a notification generated by the first-party notification interface, wherein the access token was obtained by the first third-party application in response to a request comprising the access code;
 present the notification on the client device;
 subsequently receive a request to deny permission for a second third-party application to access the first-party notification interface; and
 in response to the request to deny permission, update a setting of the client device to prevent the second third-party application from presenting notifications through the first-party notification interface.

11. The system of claim 10, the processor further configured to execute program instructions to:

reject a notification request from the second third-party application, the notification request including data from a second third-party service to be included in a notification generated by the first-party notification interface.

12. The system of claim 11, the processor further configured to execute program instructions to:
in response to the request to deny permission, revoke an access token that was previously provided to the second third-party application.

13. The system of claim 10, the processor further configured to execute program instructions to:
receive a revocation of permission for the plurality of third-party applications to access the first-party notification interface, wherein the revocation prevents the plurality of third-party applications from presenting any notifications through the first-party notification interface;
subsequently, receive, a reinstatement of permission for the plurality of third-party applications to access the first-party notification interface; and
broadcast to the plurality of third-party applications an indication of the reinstatement of permission.

14. The system of claim 10, the processor further configured to execute program instructions to determine that the client device is a primary device for the first user account, wherein the first user account is also linked to a second client device.

15. The system of claim 14, wherein the determination is based on a type of the client device.

16. The system of claim 14, wherein the second client device has a third user account for a third third-party application that is not installed on the client device.

17. The system of claim 16, wherein a third notice for the third third-party application is presented only on the second client device.

18. The system of claim 13, the processor further configured to execute program instructions to:
receive, from the third-party application operating on the client device, a third request to obtain a second access code for the first-party notification interface, wherein the second access code is exchanged for a new refresh token and a new access token by the authentication server.

19. A computer-implemented method, comprising:
requesting, by a first third-party application operating on a client device, an access code from the client device, wherein a single device-level permission to access a first-party notification interface operating on the client device that would otherwise be restricted to use only by first-party applications on the client device has been obtained for a plurality of third-party applications comprising at least the first and a second third-party application, wherein the access code defines a level of access to the client device, wherein the first third-party application is associated with a second user account at a third-party service;
receiving, by the first third-party application, the access code from the client device;
sending, by the first third-party application, a request comprising the access code to an authentication server;
responsive to the request comprising the access code, receiving, by the first third-party application, a refresh token and an access token from the authentication server; and
providing, by the first third-party application, a request to the first-party notification interface on the client device that comprises the access token and data from the third-party service to be included in a notification presented by the first-party notification interface, wherein the request initiates a process to present the notification on the client device.

20. The method of claim 19, further comprising providing the access code to the third-party service.

21. The method of claim 20, wherein the third-party service presents the access code to the authentication server and receives the refresh token and the access token.

22. A system, comprising:
non-transitory computer-readable memory having program instructions stored thereon; and
a processor of a client device associated with a first user account, the processor configured to execute the program instructions to:
request, by a first third-party application operating on a client device, an access code from the client device, wherein a single device-level permission to access a first-party notification interface operating on the client device that would otherwise be restricted to use only by first-party applications on the client device has been obtained for a plurality of third-party applications comprising at least the first and a second third-party application, wherein the access code defines a level of access to the client device, wherein the first third-party application is associated with a second user account at a third-party service;
receive, by the first third-party application, the access code from the client device;
send a request comprising the access code to an authentication server;
responsive to the request comprising the access code, receive, by the first third-party application, a refresh token and an access token from the authentication server; and
provide, by the first third-party application, a request to the first-party notification interface on the client device that comprises the access token and data from the third-party service to be included in a notification presented by the first-party notification interface, wherein the request initiates a process to present the notification on the client device.

23. The system of claim 22, the processor further configured to provide the access code to the third-party service.

24. The system of claim 23, wherein the third-party service presents the access code to the authentication server and receives the refresh token and the access token.

25. The method of claim 1, further comprising:
subsequently receiving an application-specific revocation of permission for the first third-party application, wherein the application-specific revocation prevents the first third-party application from presenting any notifications through the first-party notification interface, and but does not change permission settings for any other third-party applications.

* * * * *